United States Patent [19]

Shepherd

[11] Patent Number: 4,757,200
[45] Date of Patent: Jul. 12, 1988

[54] PULSED RADIATION DETECTION SYSTEM
[75] Inventor: Orr Shepherd, Arlington, Mass.
[73] Assignee: Visidyne, Inc., Burlington, Mass.
[21] Appl. No.: 890,109
[22] Filed: Jul. 28, 1986
[51] Int. Cl.$^4$ .......................... H01L 25/00; G01J 1/00
[52] U.S. Cl. .................................... 250/332; 250/347; 250/370.01
[58] Field of Search ............ 250/330, 332, 342, 338.1, 250/347, 353, 341, 339, 334, 370 G; 357/30; 356/342, 338

[56] References Cited
U.S. PATENT DOCUMENTS

| | | | |
|---|---|---|---|
| 3,409,773 | 11/1968 | Borst | 250/83.3 |
| 3,808,435 | 4/1974 | Bate | 250/332 |
| 4,084,092 | 4/1978 | Runciman | 250/347 |
| 4,127,877 | 11/1978 | Morishita | 358/213 |
| 4,129,887 | 12/1978 | Michon | 358/213 |
| 4,459,024 | 7/1984 | Gergely | 356/338 |

Primary Examiner—Janice A. Howell
Attorney, Agent, or Firm—Joseph S. Iandiorio; Douglas E. Denninger

[57] ABSTRACT

A high-sensitivity pulsed radiation detection system which receives pulses of radiation from a target area and includes a charge-coupled device having an array of photosensitive elements and an apparatus for receiving backscattered radiation from the target area. The apparatus repeatedly scans, across at least one row of the array, the back-scattered radiation from a plurality of regions within the target area. The photosensitive elements accumulate charges and are arranged in rows and columns. The detection system further includes a circuit for synchronizing the apparatus for scanning with the radiation pulses for accumulating in the same photosensitive element of the row charges representing the same region during successive scans.

22 Claims, 6 Drawing Sheets

PULSED RADIATION DETECTION SYSTEM

FIELD OF INVENTION

This invention relates to a system for detecting pulsed radiation signals, and more particularly to a lidar (light detection and ranging) detector capable of high-sensitivity measurements in the visible and near-infrared spectra of back-scattered radiation over successive time intervals to provide a profile of the atmosphere.

BACKGROUND OF INVENTION

Presently, atmospheric density is measured by sending radiation through the atmosphere and measuring the intensity of the radiation returned. The returning radiation consists of radiation scattered by particles and molecules in the atmosphere. The intensity of the back-scattered radiation indicates the quantity of particles and/or molecules in a portion of the atmosphere and thus represents density.

One such measurement system is a lidar detector system. A lidar system consists of an internal light source which emits a high-energy optical pulse of very short duration and a receiver which optically collects and detects the light. In an atmospheric density measurement application, the light source is a laser and the receiver includes a telescope to receive and focus the backscattered optical energy. By measuring the intensity versus time relative to laser pulsing, a profile of the backscattering medium as a function of slant range from the lidar is obtained. Many lidars use a Nd:YAG laser transmitter having a radiation output of 1064 nm. Currently, there is no detector capable of making high-sensitivity measurements in the 1000 nm spectral region.

The lidar detector previously used for the detection of 1064 nm radiation utilized the Varian Model VPM-159 photomultiplier. These photomultipliers used a gallium arsenide-phosphide photocathode which was sensitive to radiation out to 1100 nm. It had a typical quantum efficiency of 3 percent at 1064 nm. When cooled to 77° K., the tube had a dark count (counts created by noise of the detector itself) of typically 100 photoelectrons/sec. This photomultiplier was capable of counting single photoelectrons.

The VPM-159 had two characteristics which limited its usefulness. The photocathode was not a transmission type, as is standard on conventional photomultipliers, but was a small opaque cathode (0.220 by 0.250 in.) located behind the entrance window. The incident radiation was limited to an f/2.1 input cone without obscuration.

The second disadvantage of using this detector was that once manufactured it had to be continuously stored at a cold temperature of $< -20°$ C., or else sensitivity degradation of the photocathode itself would occur. This introduced additional engineering complexity when the tube was installed in systems.

The two detector types currently used for lidar 1064 nm measurements are the avalanche silicon diode and the S-1 photomultiplier. The avalanche silicon diode is a high-resistivity photodiode designed to operate in the reverse voltage avalanche region just below the junction breakdown voltage. This results in a photocurrent gain proportional to the reverse voltage.

A major disadvantage of the avalanche diode is that the diode generates a relatively large amount of background noise. The TIED 69, a typical avalanche diode, has a gain of 600 with a 165 volt reverse bias. At 1064 nm and a range bin (sample unit denoting distance surveyed) of 150 m over 1 microsecond, the TIED 69 has an equivalent rms noise of approximately 760 counts per range bin. This noise is present in each one microsecond interval of diode readout.

A second potential detector for use at 1064 nm is a photomultiplier with an S-1 spectral response. The S-1 photocathode is relatively noisy at ambient temperature and must be cooled to reduce the noise. The large size of a photomutiplier introduces the requirement for a large cooling chamber to maintain the tube temperature at $-100°$ C. In addition, the quantum efficiency of the S-1 cathode is very low, typically 0.05 percent. Thus the S-1 photomultiplier also has inherent disadvantages for use as a 1064 nm lidar detector.

These conventional techniques cannot provide both high quantum efficiency and low intrinsic noise. Nor can they accumulate photon counts over a time interval without introducing noise into the count data.

SUMMARY OF INVENTION

It is therefore an object of this invention to provide an improved lidar detector with a high quantum efficiency and high sensitivity.

It is a further object of this invention to provide such a lidar detector with low intrinsic detector noise.

It is a further object of this invention to provide such a lidar detector with minimal power dissipation which obviates the need for a large cryogenic cooling system.

It is a further object of this invention to provide such a lidar detector which lessens the thermal load on a cryogenic cooling system when cooling is desired to improve sensitivity toward low-intensity incident radiation.

It is a further object of this invention to provide an improved lidar detector having the capability to accumulate changes over time without introducing system noise.

It is a further object of this invention to provide such a lidar detector having a wide dynamic range between the minimum detectable signal and saturation of the detector.

It is a further object of this invention to provide an improved system for detecting radiation from a pulsed radiation source.

This invention results from the realization that a truly effective pulsed radiation detection system can be achieved by repeatedly scanning radiation from a plurality of regions within a target area across at least one row of photosensitive elements in a charge-coupled device to accumulate, in the same photosensitive element of the row, charges representing the same region during successive projections.

The invention features a high-sensitivity system for detecting pulsed radiation. There are means for directing pulses of radiation to a target area, a charge-coupled device having an array of photosensitive elements, and means for repeatedly scanning, across a row of the array, back-scattered radiation from a plurality of regions within the target area. The photosensitive elements of the array accumulate charges and are arranged in at least one row. There is also means for synchronizing the means for scanning the radiation pulses for accumulating in the same photosensitive element of the row charges representing the same region during successive scans.

In a preferred embodiment, the means for scanning includes optical means for receiving and focusing backscattered radiation. The charge-coupled device array includes an image area and a storage area and the invention further includes timing means for providing signals at a first rate for transferring charges from the image area to the storage area. There is also a register for receiving charges from the storage area and a register amplifier for amplifying the output of the register. The timing means may provide signals at a second rate for transferring charges from the storage area to the register. The array is placed in means for cryogenically cooling it to minimize thermally-induced noise. The invention may further include means for reading the charges from the register at a third rate. The first, second and third rates may differ from each other.

In one embodiment, the optical means is a telescope and the means for scanning includes a multifaceted mirror wheel. In another embodiment, the means for scanning includes an oscillatory mirror. The photosensitive elements of the array are arranged in a matrix of rows and columns. The accumulated charge in one column of a row represents a discrete time and distance range and the succession of columns as a row represents incremental time and distance ranges of the received backscattered radiation. The means for directing pulses of radiation provides pulses of radiation having a wavelength selected from the spectra of infrared and visible radiation. The means for directing pulses includes a laser.

The invention also features a high-sensitivity pulsed radiation detection system including a charge-coupled device having an array of photosensitive elements, and means for repeatedly scanning pulsed radiation, received from a target area, across at least one row of the array. The detection system also includes means for synchronizing the means for scanning with the pulses for accumulating in the same photosensitive element of the row charges representing the same region during successive scans.

The invention further features a method of detecting radiation from pulses of a pulsed radiation source including receiving and focussing the radiation and repeatedly scanning, in synchronization with the timing of the pulses, the focussed radiation across at least one row of photosensitive elements in a charge-coupled device array. The method also includes accumulating in the same photosensitive element of the row charges representing the same region during successive scans. The charges are read out of the array. The method may further include transferring the charges from the image area to a frame storage area at a first rate, transferring the charges to a shift register at a second rate, and reading out the charges at a third rate.

DISCLOSURE OF PREFERRED EMBODIMENT

Other objects, features and advantages will occur from the following description of a preferred embodiment and the accompanying drawings, in which.

Figure 1:
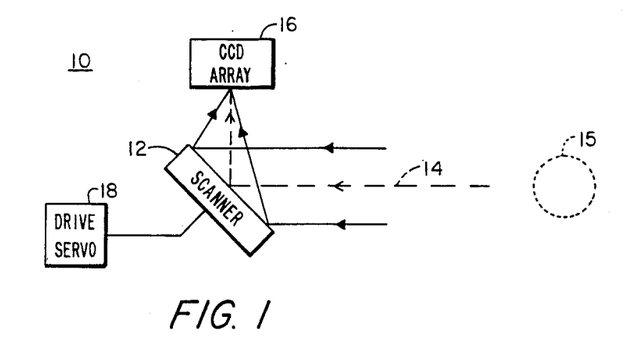
FIG. 1 is a block diagram of a high-sensitivity pulsed radiation detection system according to this invention.

The present invention is directed to a system for detecting pulsed radiation from a radiation source. Detection system 10 is shown in FIG. 1 having scanner 12 which repeatedly projects pulsed radiation 14, emitted from a remote radiation source external to the system, across charge-coupled device array 16. Radiation 14 is back-scattered from target 15 in the atmosphere; radiation 14 is generated by a nearby radiation source, typically a laser. Radiation 14 is typically visible or near-visible radiation, such as infrared radiation. Drive servo 18 synchronizes scanner 12 with incoming radiation pulses 14.

Figure 2:
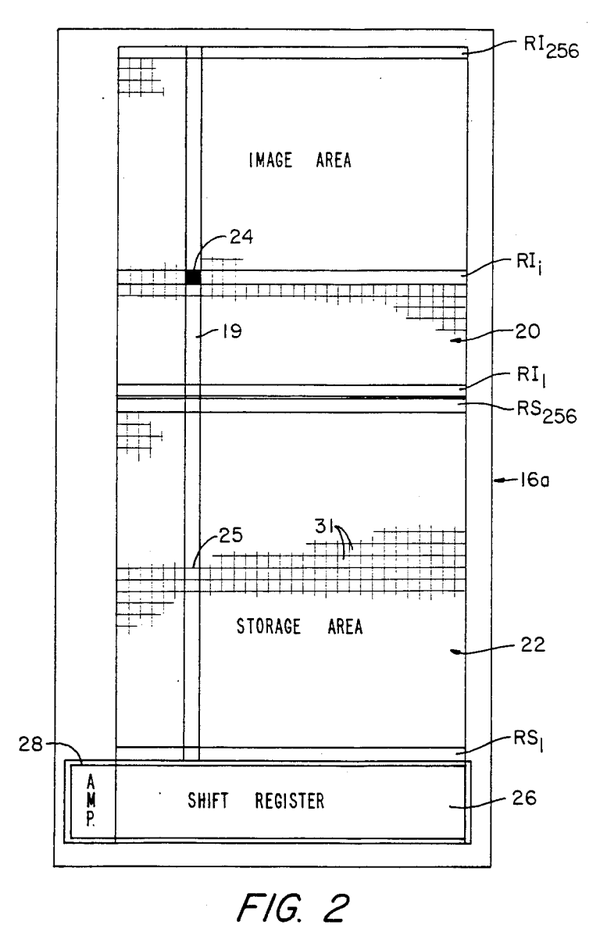
FIG. 2 is a schematic diagram of the charge-coupled device array of FIG. 1.

Charge-coupled device array 16 is shown in greater detail in FIG. 2 as array package 16a. Array package 16a includes image area 20 and storage area 22. Image area 20 has an array of photosensitive elements, such as element 24, which are preferably arranged in one or more rows $RI_i$ of rows $RI_1$ to $RI_{256}$ to accumulate charges. As described below, charges in pixel 24 are transferred successively down the column 25 into row $RI_1$ and then into the storage area 22. Storage input row $RS_{256}$ is one of rows 31 of storage area 22. The charges are transferred down rows 31 to storage output row $RS_1$ and then to shift register 26, where they are serially read out through amplifier 28 as discrete voltages.

Typically, only one or two rows of the total rows available in image area 20 are utilized. Additional rows can be used if required. While a row is typically linear, the term "row" designates any sequential arrangement of nonconnected photosensitivve elements. The term "column" designates photosensitive elements connected by charge coupling wells which are used to transfer pixels of information. The projector may scan across a fewer number of photosensitive elements or columns of a row than the total number available.

An RCA SID 501 may be used for array package 16a. The SID 501 consists of two sets of 256 rows of 320 photosensitive elements each. Each photosensitive element is a capacitive well 30 microns square which includes 3 electrodes and 1 capacitor. An incident photon creates a charge which is stored in a photosensitive element 24. The SID 501 also includes a bottom shift register and an on-chip amplifier. The SID 501 has a quantum efficiency, a measure of the number of electrons that are actually produced by a photon, of typically 4 percent; at 1.064 $\mu$m each photosensitive element can store typically $5 \times 10^5$ electrons before reaching saturation. To provide accurate measurement of the pulses, charges must be transferred out of the image area before the accumulation rows become saturated. One set of transfer timings is described below in relation to FIG. 4.

Use of an image area in combination with a transfer storage area allows continuous data accumulation without shuttering of the system during data readout. During a selected interval photons are repeatedly scanned across image area 20, FIG. 2; charges accumulate in image area 20 without introduction of system noise. Noise is introduced by the system to the data only when information is read out of array package 16a. The sole additional source of noise is thermally induced electrons. It is desirable to cool at least image area 20 since thermally-induced noise is virtually eliminated by cryogenically cooling the array package.

Figure 3:
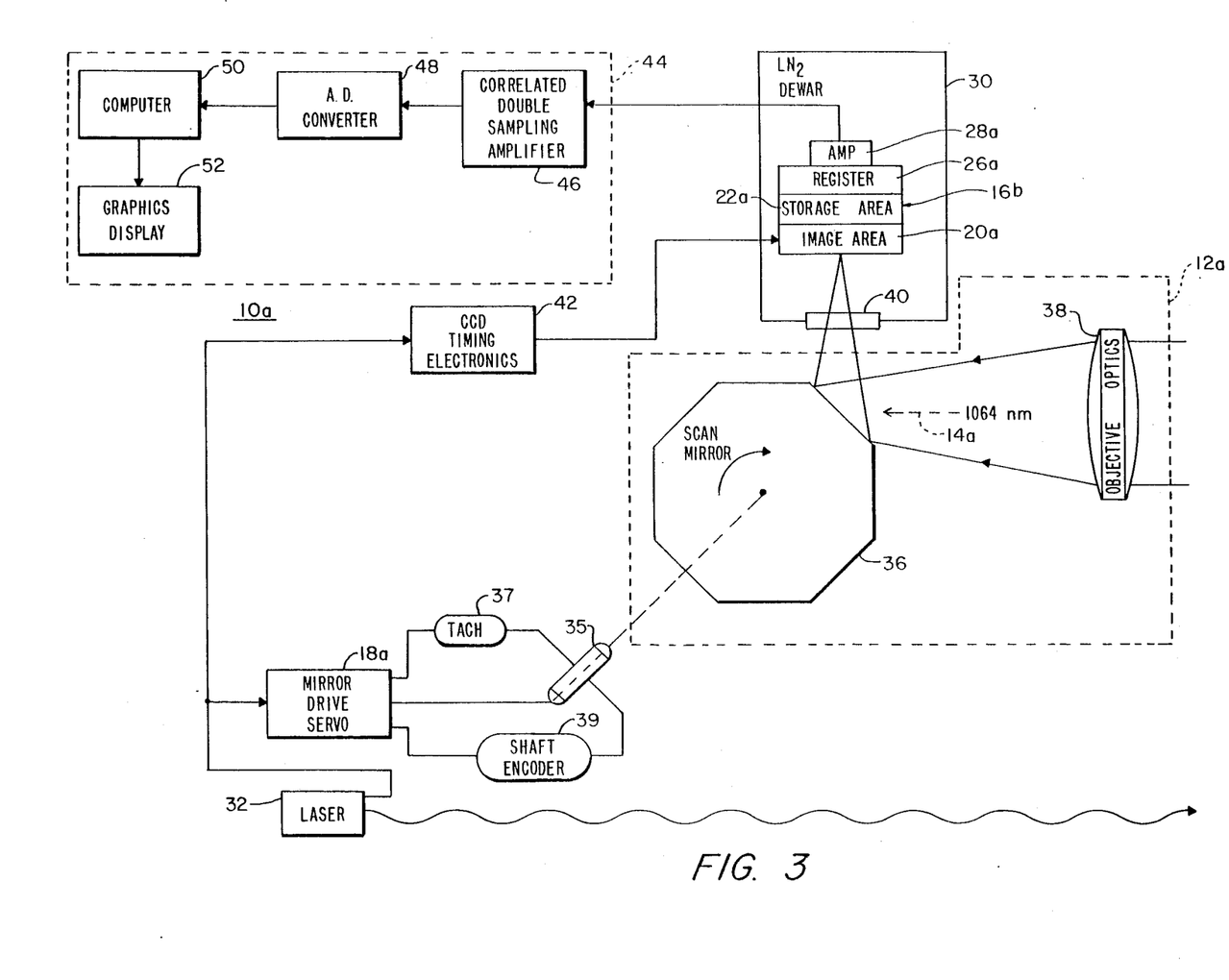
FIG. 3 is a detailed block diagram of an embodiment of the invention.
Figure 5:
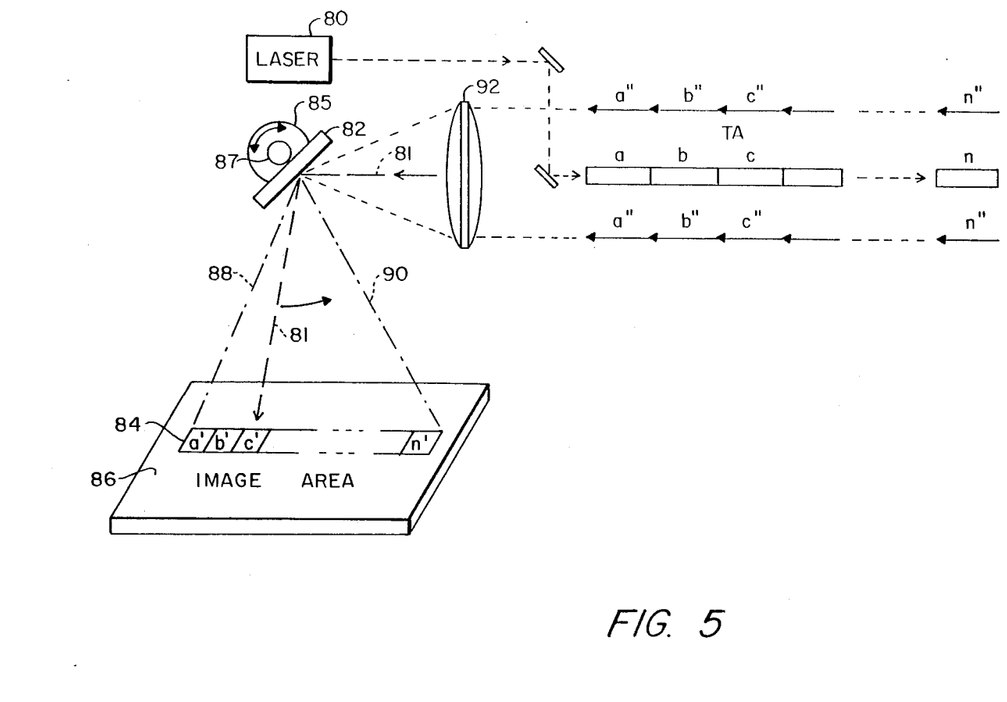
FIG. 5 is an illustration of the scanning of successive regions by the detection system of FIG. 3.

In detection system 10a, FIG. 3, array package 16b is placed in Dewar flask 30 containing liquid nitrogen at 77° Kelvin. Array package 16b such as an RCA SID 502 contains image area 20a, storage area 22a, register 26a, and register amplifier 28a. Detection system 10a further includes laser 32 such as an Nd:YAG laser for providing pulses of radiation at a wavelength of 1064 nm. Mirror-drive servo 18a synchronizes scanner 12a with pulses from laser 32 by the interaction of mirror drive servo 18a with motor 35, shaft encoder 37 and tachometer 39 as described below in relation to FIG. 7. Scanner 12a includes scan mirror 36 and objective optics 38 which receive and focus pulses of radiation 14a. A telescope is acceptable for optics 38. Scan mirror 36 is a polygonal wheel mirror driven by motor 35, as shown, or may be a piezoelectric- or motor-driven oscillatory mirror such as shown in FIG. 5, infra.

A pulse returns as backscattered radiation 14a, FIG. 3, and is projected by mirror 36 though Dewar window 40 onto a photosensitive element of image area 20a. The pulse produces a charge representing a discrete time and distance range, and the succession of columns represent incremental time and distance ranges (range bins) for the received backscattered radiation.

Charge-coupled device timing electronics 42 provides a first rate for transferring charges accumulated in image area 20a to storage area 22a, and a second rate for transferring a row from area 22a to register 26a. Detection system 10a further includes reading logic 44 for transferring the accumulated data out of register 26a through register amplifier 28a. The information for each range bin passes first through a conventional filtering circuit such as correlated double sampling amplifier 46, and then passes through A/D converter 48 to computer 50. Reading logic 44 may further include graphics display 52 for displaying a pixel of information for each range bin.

Figure 4:
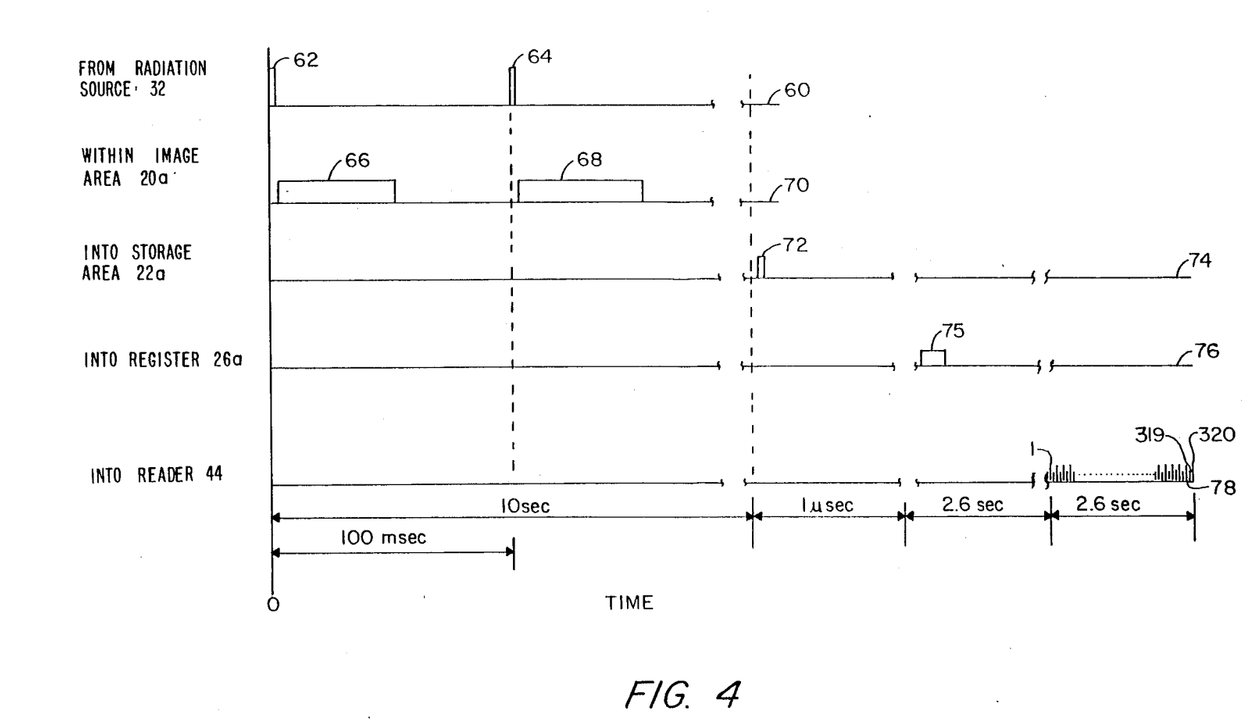
FIG. 4 is a timing diagram for the detection system of FIG. 3.

A typical pulse duration for radiation 14a is 15 nsec while an acceptable pulse duration of 1 $\mu$sec relates to a single range bin such as 1 $\mu$sec. Scan mirror 36 projects backscattered radiation from each pulse across 160 columns of a row. FIG. 4 presents a timing diagram for typical charge accumulation and transfer rates for the detection system of FIG. 3. As shown in chart 60, radiation source 32 emits a 15 nsec pulse, such as pulses 62, 64 every 100 msec. During 160 $\mu$sec period 66, chart 70, image area 20a receives backscattered radiation from pulse 62: scan mirror 36 directs the radiation on each of the 160 columns of a row for one $\mu$sec per column. The backscattered radiation from pulse 64 is successively received by the same columns of image area 20a during period 68.

At the end of a selected accumulation period, 10 seconds in FIG. 4, the charges accumulated in image area 20a are transferred down their respective columns toward the input row of storage area 22a. This transfer is accomplished quickly to minimize interruption in further charge accumulation in image area 20a. The entire 256 rows of 320 columns of image area 20a are transferred to 256 by 320 capacitive wells of storage area 22a in less than 1 msec at the transfer period of 4 $\mu$sec per row. The transfer of the first row of the image area, row $R_1$, is indicated by timing pulse 72 in chart 74.

Charges are then transferred at a second, typically slower rate one row at a time into register 26a. Rows $RS_1$ through $RS_{256}$ (not shown) of the storage array are sequentially transferred in 71 msec per row, equivalent to a 32 KHz transfer rate. Pulse 75, chart 76, represents the 71 msec transfer time or row $RS_i$. All 256 rows are transferred in 2.6 sec.

Once row $RS_i$ is in register 26a, reading logic 44 receives the information one column every 222 $\mu$sec for each of the columns 1 through 320 of row $RS_i$ of chart 78. The process is repeated for the remaining 255 rows until all columns are read out at the end of 2.6 seconds.

During one microsecond a laser pulse and its backscattered radiation travels 300 meters through the atmosphere representing a range resolution of 150 meters out and 150 meters returning: a one microsecond integration time provides 150 m range resolution. During 160 microseconds radiation travels 24,000 m each way. When a series of n photosensitive elements are successively exposed for one microsecond each, n range-bin regions are sampled as illustrated in FIG. 5. Laser 80 emits a pulse of radiation which travels distances a, b, c, ... n during successive one-microsecond intervals, each being a one-way distance of 150 m. Radiation 81 is swept by oscillatory mirror 82 across row 84 of image area 86 from column a' to column n'. Oscillatory mirror 82 is driven by oscillatory motor 85 through shaft 87; alternatively, motor 85 is a piezoelectric device. The field of view of mirror 82 is indicated by lines 88 and 90. Radiation 81 passes through lens 92 from target area TA. Range bin a" corresponds to column a': range bin a" represents a 300-meter round trip transit through the region and a 150-meter range resolution within that region. Regions in target area TA are sampled through range bin n", corresponding to column n' in image area 86.

Figure 6:
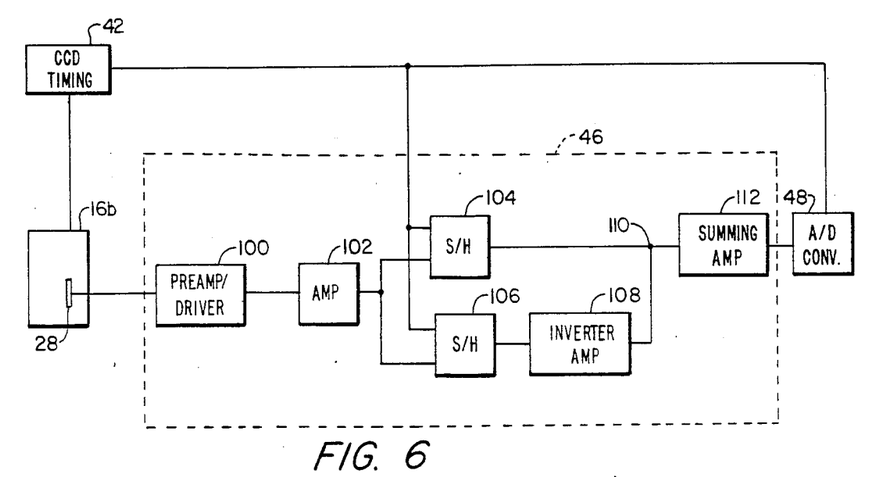
FIG. 6 is a detailed schematic diagram of the correlated double sampling amplifier of FIG. 3.

Correlated double sampling circuit 46, shown in greater detail in FIG. 6, alternately samples a signal output and a zeroed output from amplifier 28 of array 16b. As coordinated by CCD timing electronics 42, a signal containing a sample value and system noise is provided through preamplifier and driver circuit 100 and amplifier circuit 102 to sample and hold circuit 104. Amplifier 28 is then set to zero by CCD timing circuit 42 and sampled to pass a signal representing only system noise through preamp 100 and amp 102 to sample and hold circuit 106. The signal retained in sample and hold circuit 106 is inverted by inverter amp 108 and combined at point 110 with a delayed signal in sample and hold circuit 104 to cancel the effect of system noise. The signal is provided through summing amplifier 112 to A/D converter 48.

Figure 7:
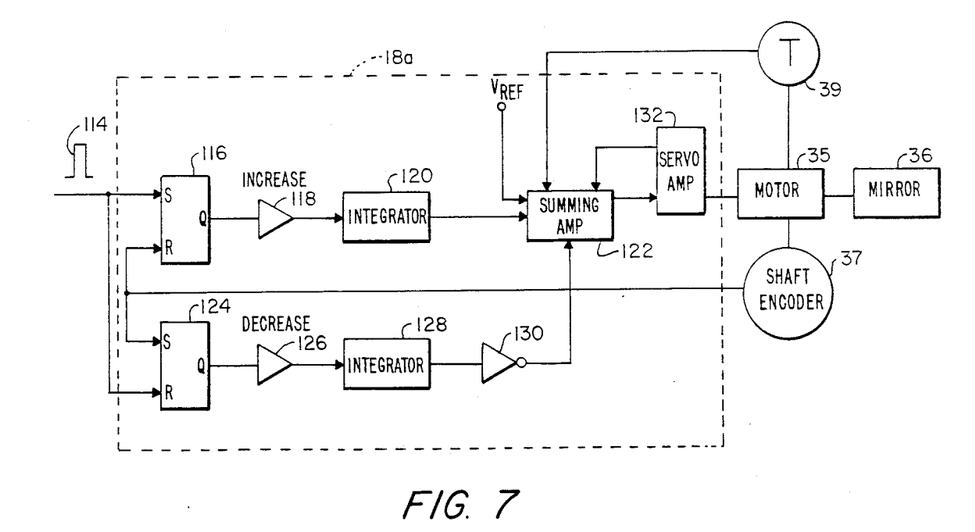
FIG. 7 is a block diagram of the mirror drive servo.

Mirror drive servo 18a, FIG. 7, coordinates mirror drive motor 35 in relation to timing of pulses, e.g., pulse 114, from laser 32. The signal from tachometer 39 is combined with a reference voltage, feedback from servo amp 132 and the signal from either flip-flop 116 or 124 depending on the timing of laser pulse 114 relative to signals from shaft encoder 37. Shaft encoder 37 indicates each completed scan of mirror 36. If, for example, the scan rate of mirror 36 must be increased to catch up with the rate of pulses from laser 32, flip-flop 116 provides a signal through amplifier 118 and integrator 120 to summing amplifier 122 until flip-flop 116 is reset by shaft encoder 37, indicating that one scan of a returning pulse has been completed. If the speed of motor 35 must be decreased, flip-flop 124 is set by shaft encoder 37 to provide a signal through amplifier 126, integrator 128 and inverter 130 to summing amplifier 122 until reset by a laser pulse signal. Summing amplifier 122 provides a larger signal when speed of motor 35 must be increased and a decreased signal when the motor speed must be decreased. This is provided through servo amplifier 132 to motor 35. When mirror 36 is an oscillatory mirror, a saw tooth signal is provided as the reference voltage.

Figure 8:
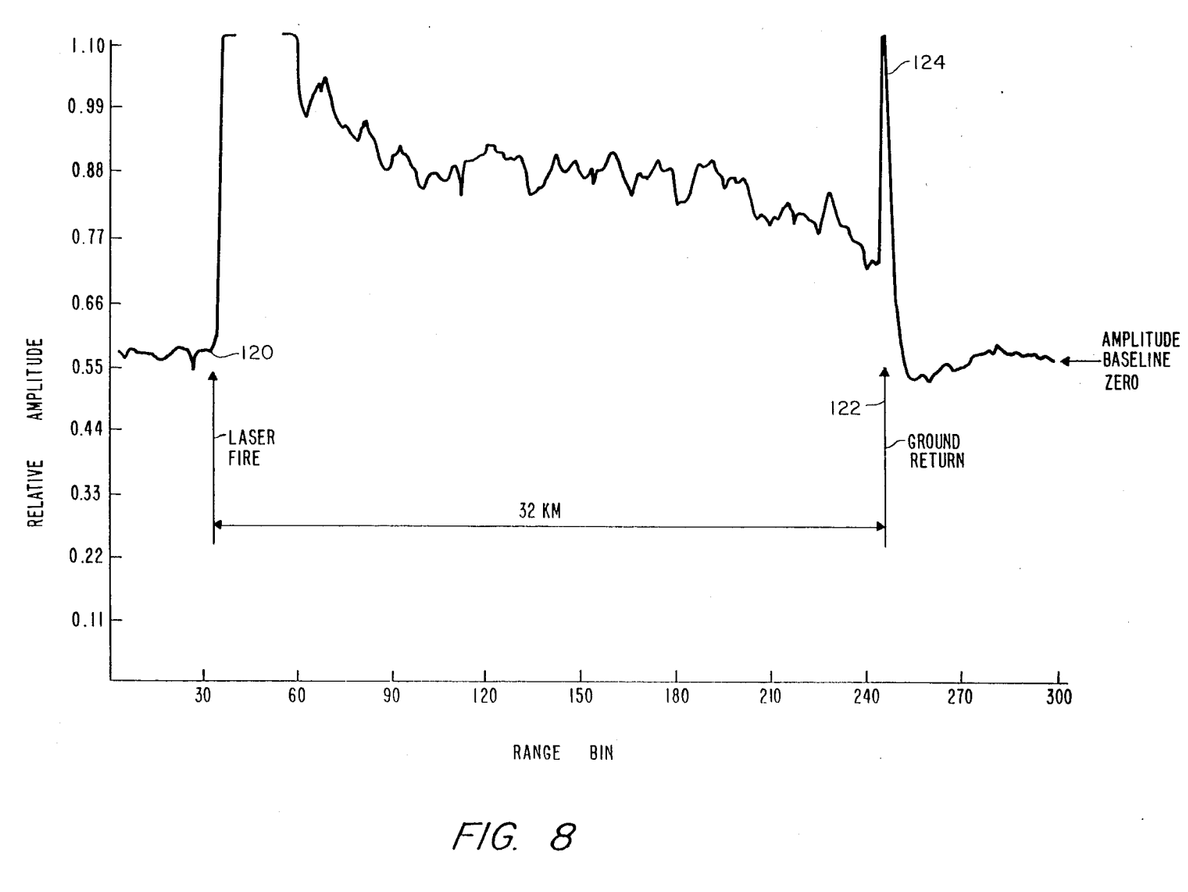
FIG. 8 is a hypothetical readout of a pulsed radiation detection system according to this invention.

A hypothetical output is shown in FIG. 8 for system 10a suspended in a balloon at 32 kilometers above the earth and firing a laser pulse at point 120 at a wavelength of 355 nm. The laser pulse initially provided a great amplitude of backscattered signals due to immediate backscattering from near-field particles and the surrounding equipment. Thereafter, as the range bins increase to ground return at point 122, the signals represent an increase in atmospheric density and a decrease in signal intensity. Spike 124 represents reflection from ground.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A high-sensitivity pulsed radiation detection system comprising:
   means for directing pulses of radiation to a target area;
   a charge-coupled device having an array of photosensitivve elements, arranged in at least one row, for accumulating charges;
   means for repeatedly scanning, across a said row of said array, backscattered radiation from a plurality of regions within said target area; and
   means for synchronizing said means for scanning with said pulses for accumulating in the same photosensitive element of said row charges representing the same region during successive scans.

2. The detection system of claim 1 in which said means for scanning includes optical means for receiving and focussing the backscattered radiation.

3. The detection system of claim 1 in which said charge-coupled device array includes an image area and a storage area.

4. The detection system of claim 3 further including timing means for defining a preselected period for accumulation of said charges by providing signals at a first rate for transferring charges from said image area to said storage area.

5. The detection system of claim 4 further including a register for receiving charges from said storage area.

6. The detection system of claim 5 in which said timing means provides signals at a second rate for transferring charges from said storage area to said register.

7. The detection system of claim 6 further including a register amplifier for amplifying the output of said register.

8. The detection system of claim 7 further including means for reading the charges from said register at a third rate.

9. The detection system of claim 8 in which said first, second, and third rates differ.

10. The detection system of claim 1 further including means for cryogenically cooling the charge-coupled device array.

11. The detection system of claim 1 in which said means for scanning includes a multifaceted mirror wheel.

12. The detection system of claim 1 in which said means for scanning includes an oscillatory mirror.

13. The detection system of claim 12 in which said optical means is a telescope.

14. The detection system of claim 1 in which said photosensitive elements of said array are arranged in a matrix of rows and columns.

15. The detection system of claim 14 in which the accumulated charge in each said column of a said row represents a discrete time and distance range and the succession of said columns in a said row represents incremental time and distance ranges of the received backscattered radiation.

16. The detection system of claim 1 in which said means for directing includes a laser.

17. The detection system of claim 16 in which said laser emits radiation having a wavelength selected from the spectra of infrared and visible radiation.

18. A high-sensitivity pulsed radiation detection system comprising:
    a charge-coupled device having an array of photosensitive elements, arranged in at least one row, for accumulating charges;
    means for repeatedly scanning, across a said row of said array, pulsed radiation received from a plurality of regions within a target area; and
    means for synchronizing said means for scanning with said pulses for accumulating in the same photosensitive element or elements of said row charges representing the same region during successive scans.

19. The detection system of claim 18 in which said photosensitive elements of said array are arranged in a matrix of rows and columns.

20. The detection system of claim 19 in which the accumulated charge in each said column of a said row represents a discrete time and distance range and the succession of columns in a row represents incremental time and distance ranges of the received radiation.

21. A method of detecting pulsed radiation comprising:
    receiving and focussing the radiation from a plurality of regions in a target area;
    repeatedly scanning, in synchronization with the timing of the pulses, the focussed radiation across at least one row of photosensitive elements in a charge-coupled device array;
    accumulating in the same photosensitive element of the row charges representing the same region during successive scans; and
    reading out the charges.

22. The method of claim 21 further including:
    transferring the charges from an image area to a frame storage area at a first rate to define a preselected period for accumulation of the charges;
    transferring the charges to a shift register at a second rate; and
    reading out the charges at a third rate.

* * * * *